Sept. 9, 1969 J. R. ERWIN 3,465,518
RADIAL OUTFLOW TURBOSHAFT ENGINE
Filed Dec. 14, 1966 2 Sheets-Sheet 1

INVENTOR.
JOHN R. ERWIN

United States Patent Office 3,465,518
Patented Sept. 9, 1969

3,465,518
RADIAL OUTFLOW TURBOSHAFT ENGINE
John R. Erwin, Cincinnati, Ohio, assignor to General
Electric Company, a corporation of New York
Filed Dec. 14, 1966, Ser. No. 601,669
Int. Cl. F02g 3/00; F02c 7/08, 3/08
U.S. Cl. 60—39.16
3 Claims

ABSTRACT OF THE DISCLOSURE

A turboshaft engine comprises a radial outflow compressor connected in series flow relationship with a radial outflow turbine. Combustor means are interposed between the compressor and turbine to provide means for generating a hot gas stream. A power turbine, comprising a disc having a circumferential cascade of turbine blades is disposed in the hot gas stream discharge from the radial outflow turbine. The disc is connected to a shaft to provide a power takeoff. Regenerator means are shown in which the hot gas stream, after it passes through the power turbine, preheats the discharge of the compressor before it enters the combustor means.

---

The present invention is directed to a compact high efficiency engine that uses a radial outflow compressor as a high pressure ratio machine and a radial outflow turbine as a high work capacity machine in back-to-back arrangement with a free-wheeling power turbine between. The radial compressor and turbine outlets are close together permitting the use of a regenerator in a close coupled arrangement to provide a compact regenerative engine.

There is a general need for compact high efficiency and low specific fuel consumption (SFC) engines in many capacities. For example, a small high powered engine for use in tanks is desired where the engine is efficient during long running times at low power. A similar engine of compact arrangement may be used in an aircraft where it would run at high power most of the time. A common engine is desired that may use a regenerator means for reducing fuel consumption at low power in a military tank or may eliminate the regenerator and use the same compact engine in an aircraft. Furthermore, the engine should eliminate, as much as possible, any complex gearing or transmission structure and yet be able to idle under all operating conditions and applications.

The main object of the present invention is to provide a compact combination radial outflow compressor-radial outflow turbine engine with a free-wheeling power turbine.

Another object is to provide a compact engine of the type described which uses known components and adds a free-wheeling turbine to provide a new combination.

A further object is to provide such an engine that lends itself to staging in either the compressor or turbine components to provide for additional pressure ratios or work extraction stages or both.

Another object is to provide such a compact engine that utilizes an efficient cycle, provides high pressure ratio, provides regeneration as needed, all at a low SFC.

Briefly stated, the invention provides a radial outflow turboshaft engine that has a shaft, a radial outflow compressor that is rotatable on the shaft and has highly cambered rotor blades on the compressor at a radial distance from the shaft so that the blades receive substantially radially flowing fluid only. The compressor includes a rotating vaneless diffuser that extends beyond the rotor blades. Adjacent the compressor there is provided a free-wheeling power turbine disc that is axially spaced on the shaft and this, in turn, is followed in axial spacing by a radial outflow turbine that is connected to drive the compressor. Means are provided to connect the compressor outlet and the turbine inlet and a combustor is disposed in the connecting means. The turbine has a curved inlet and highly cambered buckets radially out from its inlet to receive substantially radially flowing fluid only and is also followed by a rotating turbine vaneless diffuser extending beyond the cambered buckets. The free-wheeling power turbine disc extends radially beyond both the compressor and turbine diffusers and is provided with turbine buckets on the disc which are disposed in the turbine exhaust for work extraction. The other side of the disc may be provided with additional compressor stages to raise the static and total pressure. A power takeoff means is suitably connected to the disc so that the turbine drives the compressor and the turbine exhaust drives the disc. Additional refinements including regenerator means disposed in the connecting means for preheating the compressor fluid may be provided in combination with a thermosyphon for bucket cooling.

While the specification concludes with claims particularly pointing out and distinctly claiming the subject matter which is regarded as the invention, it is believed the invention will be better understood from the following description taken in connection with the accompanying drawing in which:

The present invention uses a known radial outflow compressor of the type disclosed and claimed in co-pending application Ser. No. 243,561, filed Dec. 10, 1962, now abandoned, and of common assignment. It also uses a radial outflow turbine of the type shown in co-pending application Ser. No. 472,486, filed July 16, 1965, now Patent No. 3,378,229, and of common assignment. These co-pending applications relate to a unique compressor and turbine respectively and are thoroughly described in said applications. Consequently, the terms radial outflow compressor and radial outflow turbine used herein are intended to be components of the type described in said co-pending applications. To these known components there is added a free-wheeling power turbine disc in a unique combination to provide the compact engine of the present invention.

Figure 1:
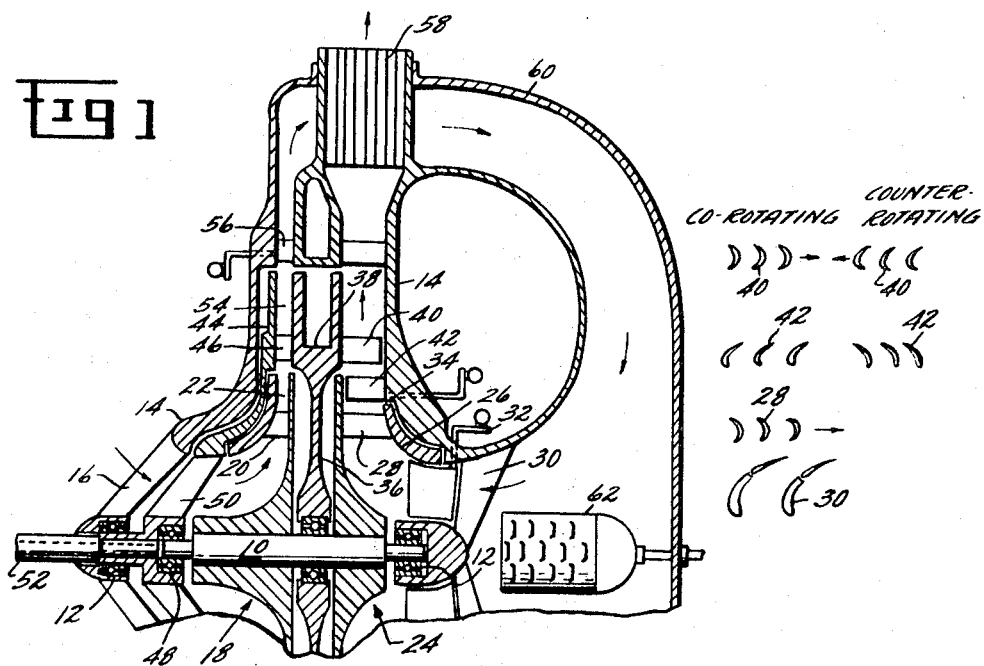
FIG. 1 is a partial cross-sectional view illustrating the general compact turboshaft engine with the airfoil blading projected to show its positioning.

Referring first to FIG. 1, there is shown the compact engine that comprises a shaft 10 that is mounted for rotation in bearings 12 suitably supported from an outer housing 14 through struts 16. In order to provide air compression and a high pressure ratio, there is disclosed a radial outflow compressor generally indicated at 18 which has highly cambered rotor blades 20 at a radial distance from the shaft, the arrangement being such that the blades receive substantially radially flowing fluid only as defined in the referenced co-pending application Ser. No. 243,561 and now abandoned. In order to raise the static pressure, the rotor or compressor blades are followed by a rotating compressor vaneless diffuser 22 to provide a very high pressure ratio compressor all as fully described in said co-pending application.

In order to drive the compressor, there is provided axially spaced and in a back-to-back arrangement, a radial outflow turbine generally indicated at 24. As such, it is provided with a curved inlet 26 and highly cambered buckets 28 radially out from the inlet to receive substantially radially flowing fluid only.

Suitable nozzles 30 may be provided, as required, and these may be variable by a pivot means 32 in two parts, as shown. Similarly, the turbine buckets are followed by a rotating turbine vaneless diffuser 34. This arrangement provides a radial outflow turbine of the type described in said co-pending application Ser. No. 472,486, now Patent No. 3,378,229.

In order to provide power takeoff means from the combination of the radial outflow compressor driven by the radial outflow turbine, a free-wheeling power turbine disc 36 is disposed on shaft 10 sandwiched between the compressor and turbine and independently rotatable about shaft 10. To extract and transmit power, the disc must extend radially beyond the compressor and turbine diffusers as shown at 38. Power is extracted by means of turbine buckets 40 located in the turbine exhaust and carried by the disc extension. Proper entrance to the turbine buckets may be obtained by variable nozzles 42 carried by the housing beyond the diffuser 34. Thus, the free-wheeling disc 36 extracts the work in the turbine exhaust by means of buckets 40 and is thereby driven by the turbine exhaust. Any suitable power takeoff may be provided and the compact arrangement described lends itself very well to a power takeoff of a concentric shroud 44 that may be carried from extension 38 by struts or additional compressor stages 46 and is supported by bearings 48 through struts 50 to drive the power takeoff means 52 which may be hollow to start the engine through shaft 10.

Since the free-wheeling power turbine disc 36 is independent of the other components, it may be co-rotating in which case the various turbine airfoils assume the configuration shown at the side of FIG. 1 or preferably, it may be counter-rotating as also shown projected in FIG. 1. The counter-rotation has advantages of reducing the rotation of the bearings about shaft 10 and thus the wear. Also, in aircraft applications the counter-rotation cancels gyroscopic effects within the framework of the compressor and may provide additional pressure ratio when a two stage compressor having blades 20 and 46 is used. It should also be noted that this structure permits the use of an additional rotating diffuser 54 at a large radius ratio which is efficient in reducing the high velocity flow in the compressor before the final stators 56 in the housing 14.

The arrangement just described provides for a very close coupled common outlet or exit from the compressor and turbine as shown. This lends itself to the use of a regenerator 58 in the exhaust to preheat the compressor air ahead of the turbine inlet. The high pressure ratio air from compressor 18 is directed to the turbine inlet by suitable connecting means 60 and this compressed air has energy added by combustor 62 in the connecting means. By the close coupled exit arrangement, regenerator 58 may be disposed in the connecting means and connected to the turbine exhaust. By being disposed in the connecting means, it can be seen that the turbine exhaust preheats the compressor fluid before it has its energy level raised by combustor 62 and is directed into the turbine. All this is provided by the close coupled exits from the compressor and turbine and provides an overall compact and flat powerplant package that may be used with or without the regenerator. The use of this engine in a military tank requires much running at low power. The regenerator 58 is a way of considerably reducing the fuel consumed during low power operation. In an aircraft application the engine would run at high power most of the time and the regenerator may be omitted if desired.

Figure 2:
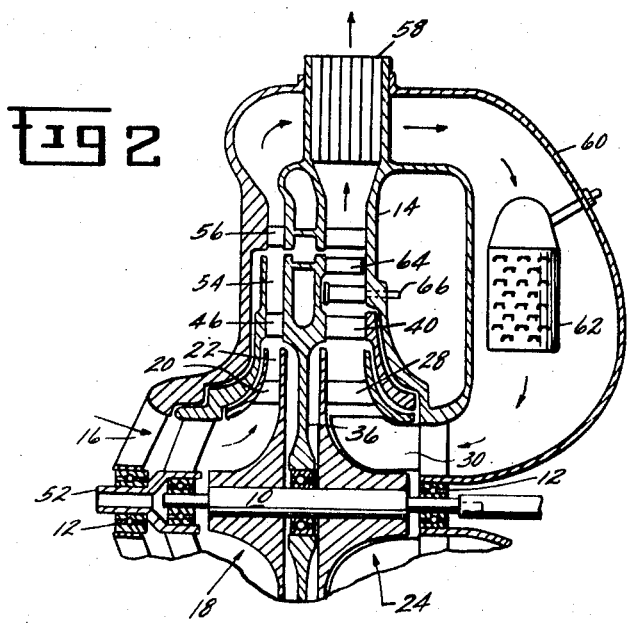
FIG. 2 is a view similar to FIG. 1 showing a modification employing turbine staging.

Referring next to FIG. 2, a modification is shown which is quite similar with the exception that the combustor 62 may be more flatly rearranged as shown and, more importantly, the disc 36 is provided with an additional turbine bucket stage 64 radially outward from buckets 40. This may require the use of variable nozzles 66 for the same purpose as nozzle 42 in FIG. 1. Thus, a series of stages is provided. The use of the additional stages permits the extraction of the same amount of power at lower speed reducing any transmission or gearing and permitting a closer match to a fan if one is used in an aircraft powerplant. In other words, the additional stages permit power extraction at lower speeds. The rest of the power plant shown in FIG. 2 is substantially the same as FIG. 1.

Figure 3:
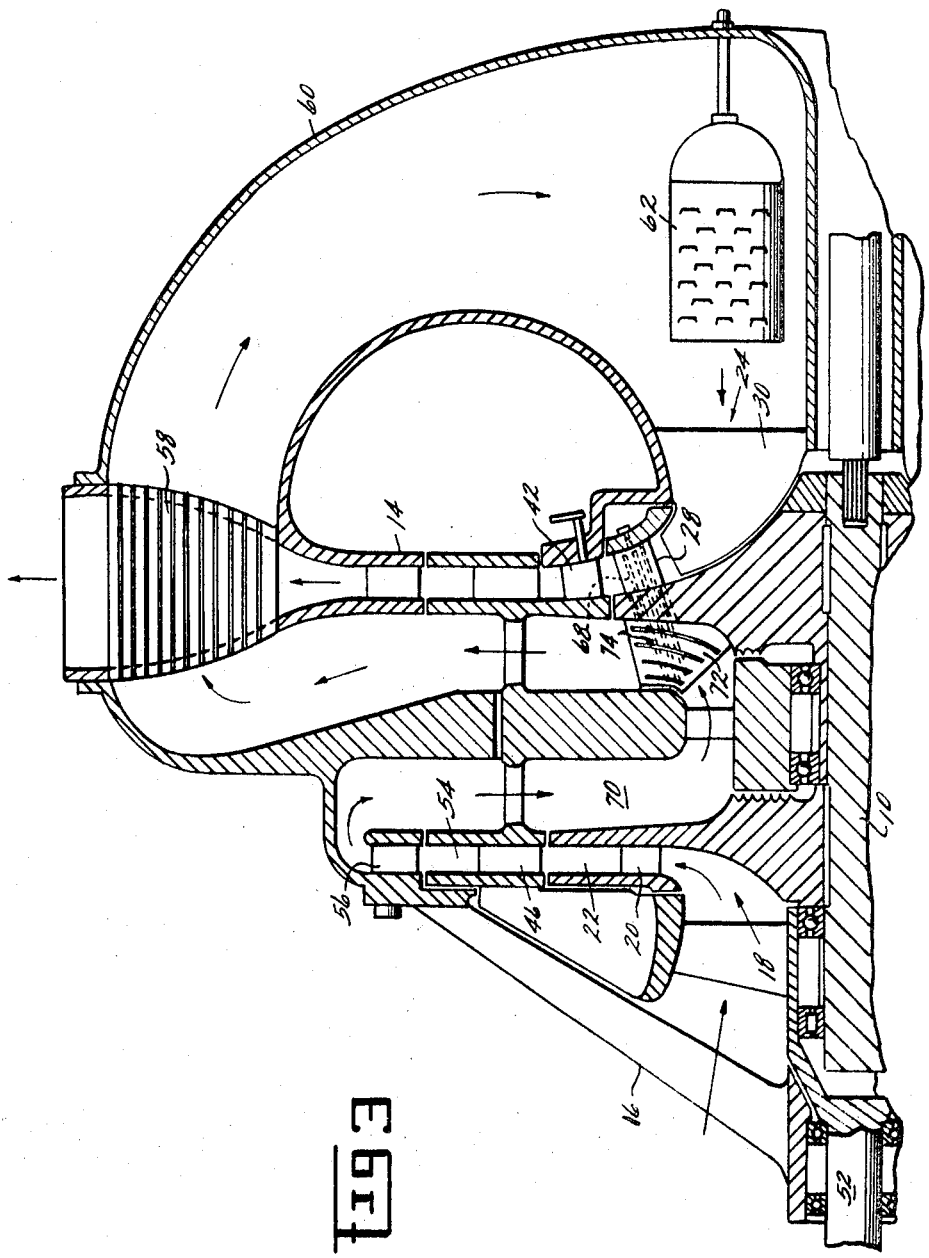
FIG. 3 is another modification of a cooling flow arrangement that retains the bucket cooling air in the cycle as well as the heat that is extracted from the turbine buckets.

Referring to FIG. 3, an arrangement employing the general concept disclosed in co-pending application Ser. No. 273,003, filed Apr. 15, 1963, now Patent No. 3,314,649, of common assignment, may be used. This application illustrates the use of a thermosyphon wherein liquid sealed cooling means 68 such as liquid metal may be used. This modificatiin requires a reverse flow arrangement through passage 70 which brings the compressor air in close to the axis of rotation where it is then passed across an extension portion 72 to the turbine blades where, by means of fins 74 the heat picked up in the exhaust gas passage of the turbine is removed by the cooling air flow through passage 70. This manner of cooling is generally shown and described in said co-pending application. The air is then funneled out through the regenerator 58 and continues back through the turbine buckets 28 in the same manner as the modifications of FIGS. 1 and 2. Such an arrangement provides a regenerative system which does not require that the cooling air be lost to the cycle since all the cooling air in passage 70 is subsequently heated by the combustor and used. Additionally, the heat that is removed from buckets 28 by the liquid metal is transferred to the incoming cooling air in passage 70 so that heat is not lost to the cycle. In other words, this general arrangement provides that the cooling air and the heat extracted are both maintained in the cycle to reduce losses.

The general combination of the radial outflow compressor and the radial outflow turbine with the freely rotating power turbine disc between, with or without the regeneration, thus permits a very compact, high efficiency, low SFC engine that has wide application for either low power extraction or high power extraction for a wide variety of uses. This general combination is common to all three of the figures disclosed and the general combination may be modified by multi-staging the compressor or the turbine or both and by rerouting the compressor air so that it is used for cooling when the application demands.

While there have been described preferred forms of the invention, obviously modifications and variations are possible in light of the above teachings.

What is claimed is:

1. A turboshaft engine comprising,
    a main housing having spaced, coaxial bearings at its opposite ends and air and hot gas inlets, respectively, surrounding said bearings,
    first and second rotors, said first and second rotors having radially aligned, concentric impellers forming a radial outflow compressor,
    passageway means for ducting the compressor discharge to the hot gas stream inlet,
    means in said passageway means for burning fuel to generate a hot gas stream,
    said first and second rotors having radially aligned, concentric blades forming a radial outflow turbine,
    said first rotor comprising a shaft journaled at one end on the hot gas inlet bearing and a pair of axially spaced discs respectively carrying said compressor impellers and turbine blades of the first rotor, said second rotor comprising a disc journaled on the first rotor shaft between the first rotor discs, said second rotor disc having mounted thereon, on its opposite sides, the compressor impellers and turbine blades of the second rotor, said second rotor having a second disc connected to the compressor impellers of the second rotor and a shaft connected to this second disc by struts extending through the air inlet to the compressor, said second rotor shaft being journaled in said air inlet bearing and the other end of said first rotor shaft being journaled on said second rotor shaft.

2. A turboshaft engine as in claim 1 wherein, the turbine discharge and the passageway means for the compressor discharge cross through a heat exchanger upstream of the fuel burning means.

3. A turboshaft engine as in claim 1 wherein, the second rotor disc has a second concentric row of turbine blades to provide a two-stage turbine arrangement for the second rotor shaft.

References Cited
UNITED STATES PATENTS

| | | | |
|---|---|---|---|
| 3,052,096 | 9/1962 | Pavlecka | 60—39.16 X |
| 2,842,306 | 7/1958 | Buchi | 230—116 |
| 3,037,349 | 6/1962 | Gassmann | 60—39.16 |

FOREIGN PATENTS

| | | |
|---|---|---|
| 200,244 | 11/1955 | Australia. |
| 724,176 | 2/1955 | Great Britain. |
| 876,867 | 9/1961 | Great Britain. |

CARLTON R. CROYLE, Primary Examiner

ALLAN D. HERRMANN, Assistant Examiner

U.S. Cl. X.R.

60—39.36, 39.51